(12) United States Patent
Doxey et al.

(10) Patent No.: US 8,146,994 B2
(45) Date of Patent: Apr. 3, 2012

(54) RECLINER MECHANISM

(75) Inventors: Kyle M. Doxey, Ann Arbor, MI (US);
Kurt A. Seibold, Whitmore Lake, MI (US); Richard Tann, Lasalle (CA);
Michael J. Thomas, Ann Arbor, MI (US)

(73) Assignee: Johnson Controls Technology Company, Holland, MI (US)

( * ) Notice: Subject to any disclaimer, the term of this patent is extended or adjusted under 35 U.S.C. 154(b) by 245 days.

(21) Appl. No.: 12/104,934

(22) Filed: Apr. 17, 2008

(65) Prior Publication Data

US 2009/0001751 A1 Jan. 1, 2009

Related U.S. Application Data

(60) Provisional application No. 60/907,832, filed on Apr. 18, 2007, provisional application No. 60/924,365, filed on May 10, 2007.

(51) Int. Cl.
*B60N 2/22* (2006.01)

(52) U.S. Cl. .................................. 297/354.12; 297/361.1
(58) Field of Classification Search ............ 297/354.12, 297/354.1, 361.1
See application file for complete search history.

(56) References Cited

U.S. PATENT DOCUMENTS

| 4,789,204 A * | 12/1988 | Kanazawa ............... 297/354.12 |
| 6,322,148 B1 * | 11/2001 | Kolena et al. ............ 297/354.12 |
| 2007/0182228 A1 | 8/2007 | Elio et al. |

* cited by examiner

*Primary Examiner* — Anthony D Barfield
(74) *Attorney, Agent, or Firm* — Foley & Lardner LLP

(57) ABSTRACT

A tube recliner mechanism for a vehicle seat having a reclining seat back includes an inner tube extending in a lateral cross vehicle direction and having inboard and outboard ends, an outer tube positioned around the inner tube, and a cylindrical spacer positioned between the inner tube and the outer tube. The relative rotational position of the inner and outer tubes is configured to change via rotation of one of the inner and outer tubes. The spacer, inner tube, and outer tube are all concentrically positioned to thereby reduce friction between the inner and outer tubes during relative movement between the tubes.

16 Claims, 6 Drawing Sheets

RECLINER MECHANISM

CROSS REFERENCE TO RELATED APPLICATIONS

The present application claims the benefit of and priority to U.S. Provisional Patent Application No. 60/907,832 filed on Apr. 18, 2007 and U.S. Patent Application No. 60/924,365 filed on May 10, 2007. Both of the aforementioned provisional applications are incorporated by reference herein in their entireties.

BACKGROUND

The present application relates generally to the field of seating systems for use in passenger vehicles. This application relates specifically to the construction of a tube recliner mechanism for use in conjunction with a seat structural system to provide adjustability of the seat-back of a seat system and to provide adequate strength to meet all federal and customer requirements.

Seating systems have used many different methods to achieve the combination of adjustability in the form of a reclining seat-back and strength to properly protect the occupant during a vehicle dynamic impact event. Recliner mechanisms have been coupled with the structural components of the seating systems in single sided (i.e., one recliner per occupant) or dual sided (i.e., two recliners per occupant) applications. Recliner mechanisms have used methods of continuous engagement of the internal locking mechanism, such as a planetary gear system or a linear screw mechanism, to achieve these goals. Additionally, recliner mechanisms have used methods of discontinuous engagement of the internal locking mechanism, such as pawl and sector, or rotary recliner mechanisms. These recliner mechanisms have been separate from the other structural components of the seating system and have been connected to the other structural components through the use of bolts, rivets, and welding. It has become commonplace to weld recliner mechanisms to the structural components of the seat system.

It would be advantageous if the recliner mechanism was protected from entry of foreign matter and from contact of the other seating components that could interfere with the function of the recliner mechanism. It is also advantageous to have a recliner mechanism with low operation friction and reduced looseness. Looseness in recliner mechanisms lead to complaints in the level of perceived quality as well as noise related issues. It would also be advantageous to join the recliner mechanism to the structural components without the use of welding, bolts or rivets. Welding of recliner mechanisms can cause undesired function by deforming precision components or could cause other problems resulting from weld expulsion during the process. Bolts and rivets add additional mass and cost to the system and their use should be avoided if possible.

SUMMARY

An exemplary embodiment of a tube recliner mechanism for a vehicle seat having a reclining seat back includes an inner tube extending in a lateral cross vehicle direction and having inboard and outboard ends, an outer tube positioned around the inner tube, and a cylindrical spacer positioned between the inner tube and the outer tube. The relative rotational position of the inner and outer tubes is configured to change via rotation of one of the inner and outer tubes. The spacer, inner tube, and outer tube are all concentrically positioned to thereby reduce friction between the inner and outer tubes during relative movement between the tubes.

An exemplary embodiment of a seat system for an occupant of a vehicle that includes a seat-back and a seat-bottom includes a tube recliner mechanism for providing adjustable rotation of the seat-back for the comfort of the occupant. The tube recliner mechanism includes an inner tube extending laterally in a cross vehicle direction and an outer tube positioned around the inner tube. The relative rotational position of the inner and outer tubes is configured to change and the tube recliner mechanism is located adjacent a seat cushion and includes a shroud positioned to cover the tube recliner mechanism to thereby prevent interference between tube recliner and adjacent components of the seat.

DETAILED DESCRIPTION

Figure 1:
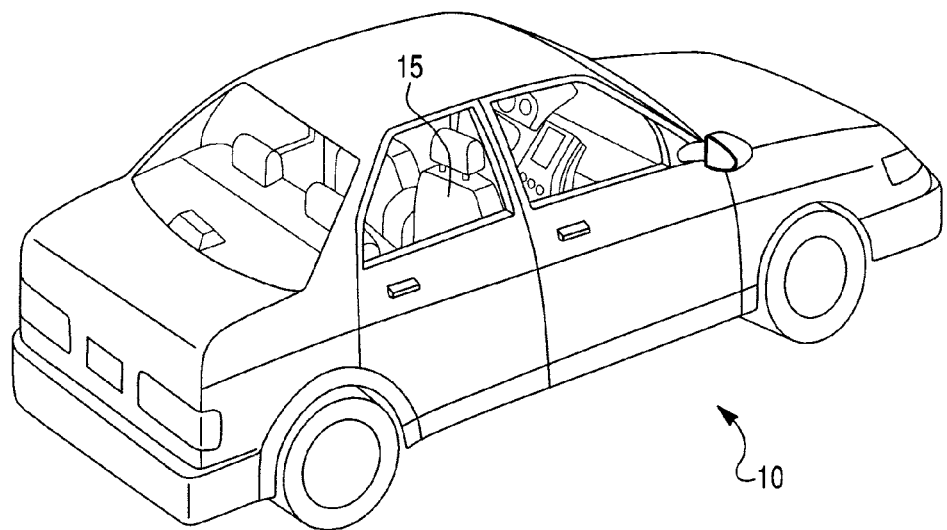
FIG. 1 is a perspective view of an exemplary embodiment of a vehicle.

The tube recliner mechanism integrates the structural components of the seat system with the mechanism components that are used to rotate the seat-back for comfort adjust or for folding the seat-back flat to provide a flat utility floor. The tube recliner mechanism includes an outer tube pivotally coupled to an inner tube through an internal locking mechanism. The internal locking mechanism includes a plurality of locking pins that rotate when the inner tube rotates, but are able to move inward or outward in a radial direction with respect to the inner tube, in order to engage or disengage a respective aperture in the outer tube. When the pins are moved inward, or towards the center of the inner tube, they become disengaged from their respective aperture in the outer tube, which allows for free rotation between the inner and outer tubes, and thusly provides rotation of the seatback. When the pins move outward, or away from the center of the inner tube, they become engaged with their respective aperture in the outer tube and prevent rotation between the inner and outer tubes, and thusly provide the strength required during a dynamic impact event of the vehicle. The pins may be driven into engagement through the use of springs, such that disengagement of the pin from its respective aperture in the outer tube requires the application of an external force by the occupant. The tube recliner mechanism can be constructed such that the outer tube connects to the back-frame and the inner tube connects to a lower mounting structure, or it may be constructed such that the outer tube connects to a lower mounting structure and the inner tube connects to the back-frame.

Operation of a tube recliner system is described in detail in U.S. Patent Application Publication No. 2007/0182228, the disclosure of which is incorporated by reference herein. It is intended that the exemplary embodiments described herein may be used with any suitable tubular recliner system, including but not limited to those disclosed in the aforementioned published patent application.

An exemplary embodiment of a tube recliner mechanism includes an outer tube constructed concentric to and around an inner tube, whereby the inner and outer tubes relative rotation through an internal locking mechanism. The outer tube may be connected to the back-frame of the seat system and may be pivotally connected through an internal locking mechanism to the inner tube, which may be connected to a mounting bracket through the process of swaging. The swaging process eliminates the need to weld the inner tube, therefore eliminating the possibility of deforming or warping the precision mechanism components by the addition of heat associated with welding. It is also undesirable to weld tubes because welding processes create expulsion of material (i.e., weld spatter) which may collect inside a tube and create noise and function issues. The swaging process also eliminates the need to use fasteners (e.g., bolts or rivets) to connect the components, which reduces the mass and cost of the seat system.

The swaging process is one example of a cold forming process used to create an interference fit between one of the tubes and the seat frame components. According to an exemplary embodiment, the inner tube is connected in an interference fit to the mounting bracket and the outer tube rotates with the seat back. According to another exemplary embodiment, the outer tube is connected to the mounting bracket or side member in an interference fit and the inner tube rotates with the seat back.

An exemplary embodiment of a tube recliner mechanism also includes at least one spacer which sits between the inner and outer tubes to provide concentricity and to reduce friction during relative rotation between the tubes. The spacer or outer tube may include an anti-rotation feature which prevents the relative rotation between the spacer and outer tube. An exemplary tube recliner mechanism may further include a shroud which covers the tube recliner mechanism to prevent debris from entering the internal locking mechanism and to prevent other seat system components from contacting the pins of the internal locking mechanism. The outer tube may include protrusions in the form of extruded holes, lanced tabs, or dimples to maintain the proper distance between the shroud and the outer tube.

Referring to FIG. 1, an exemplary embodiment of a vehicle 10 is illustrated and includes a seat system 15. An exemplary seat system 15 is illustrated as a front passenger seat system, but may be configured for use as a front driver seat system, or any rear seat system.

Figure 2:
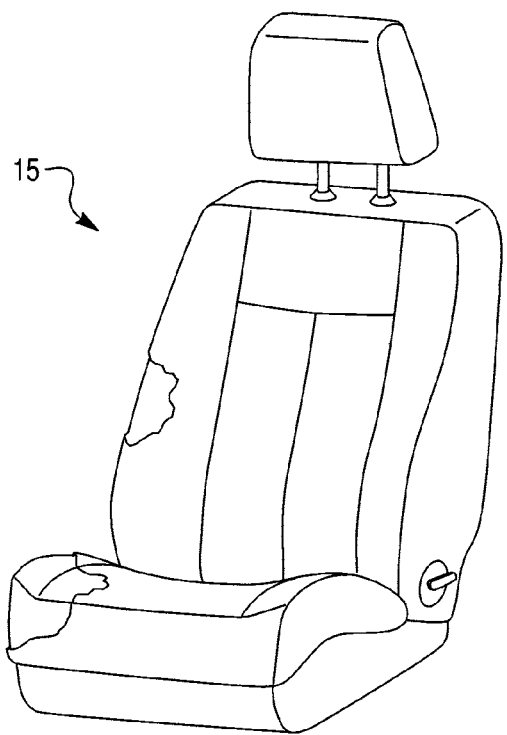
FIG. 2 is a perspective view of an exemplary embodiment of a seat system for use in a vehicle.

Referring to FIG. 2, an exemplary seat system 15 is illustrated as a fully trimmed single occupant seat system. A fully trimmed seat means that the seat structure has been covered with foam and a material, such as leather or synthetic cloth, to finish the seat, so it is complete and ready for installation into vehicle 10. According to other exemplary embodiments, a seat system could be constructed for use with multiple occupant seating for use in any seat system within vehicle 10.

Figure 3:
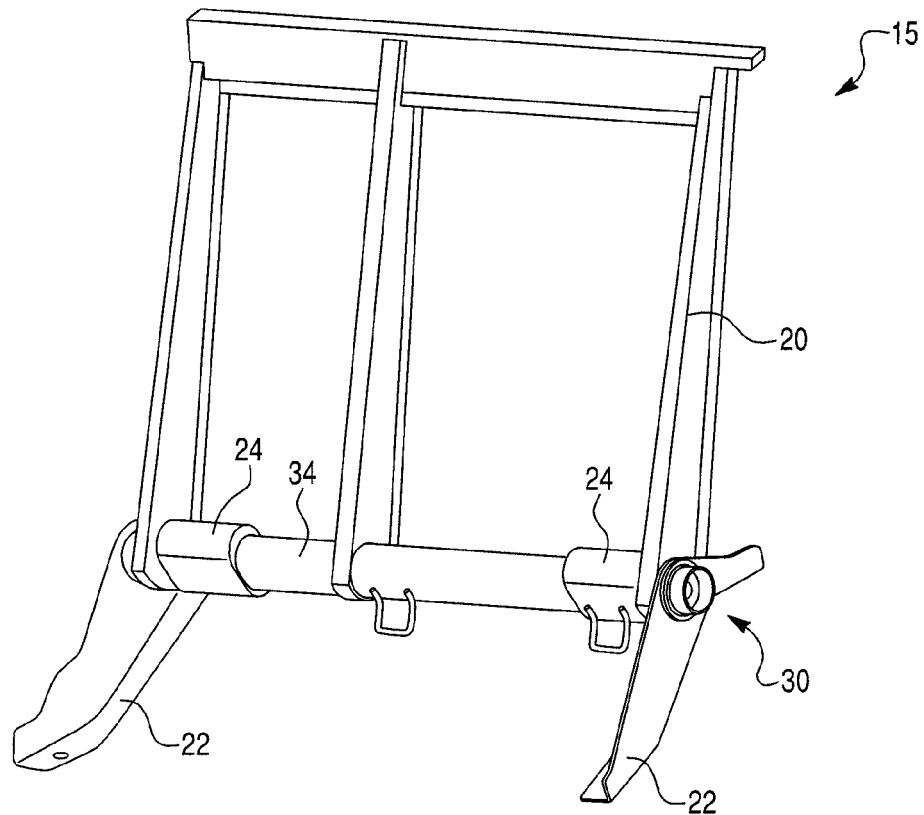
FIG. 3 is a perspective view of an exemplary embodiment of a seat structure including an exemplary recliner mechanism for use in a seat system.

Referring to FIG. 3, a portion of an exemplary seat system 15 is illustrated without the foam and trim of the seat, such that the structural components which manage the load to which the seat system is subjected (e.g., during a dynamic vehicle impact) are shown. Seat system 15 includes a back-frame 20, at least one mounting bracket 22, at least one shroud 24, and at least one tube recliner mechanism 30. The seat structure of an exemplary seat system 15 may be constructed with back-frame 20 connected to tube recliner mechanism 30, and pivotally connected to mounting bracket 22, through tube recliner mechanism 30. Mounting bracket 22 is illustrated as connecting to the vehicle floor pan, but may be constructed to connect to a seat structure component such as a seat cushion pan or a track mechanism or other useful seat component. The purpose of shroud 24 is to protect the tube recliner mechanism from being contacted by other components, (e.g., foam being deflected as a result of an occupant sitting in the seat system). Seat system 15 is illustrated as including one tube recliner mechanism 30, which is constructed including two internal locking mechanisms 31. An alternative embodiment of tube recliner mechanism 30, may include one internal locking mechanism 31 and one free pivot on the opposite end of internal locking mechanism 31. A free pivot means to have two non-locking pivotally connected components.

Also referring to FIG. 3, an exemplary outer tube 34 may be made from a single section steel and may maintain a uniform diameter and cross sectional thickness throughout the entire length of the single section.

According to another exemplary embodiment, the outer tube may be constructed from multiple sections, each having varying mechanical properties (e.g., yield strength), such that the stronger sections are the outer sections which engage internal locking mechanism 31. This embodiment of the outer tube is more efficient at load carrying or load management, since the higher shear stresses occur as a result of the loading from pins 35, of internal locking mechanism 31, which are at the outer ends of the outer tube. Alternatively, the outer tube may join the multiple sections into one tube by a welding process (e.g., laser seam) or other useful process.

According to another exemplary embodiment, the outer tube may be constructed from three sections, each having a common outer diameter, but the inner section having a thinner wall thickness than both outer sections. The different sections may be made from the same material or different materials. This embodiment of outer tube is more efficient at load carrying or load management, since the higher shear stresses occur as a result of the loading from pins 35, of internal locking mechanism 31, which are at the outer ends of outer tube 34. Alternatively, the outer tube may join the multiple sections into one tube by a welding process (e.g., laser seam) or other useful process.

Figure 4:
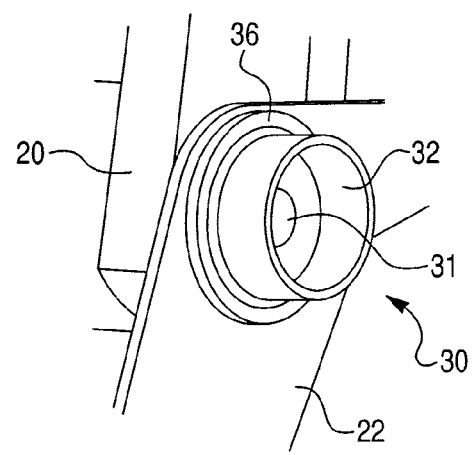
FIG. 4 is a front perspective view of an exemplary embodiment of a tube recliner mechanism.
Figure 7:
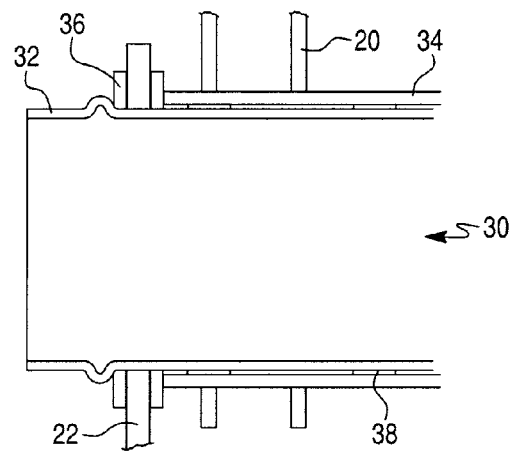
FIG. 7 is a partial section view of an exemplary tube recliner mechanism
Figure 10:
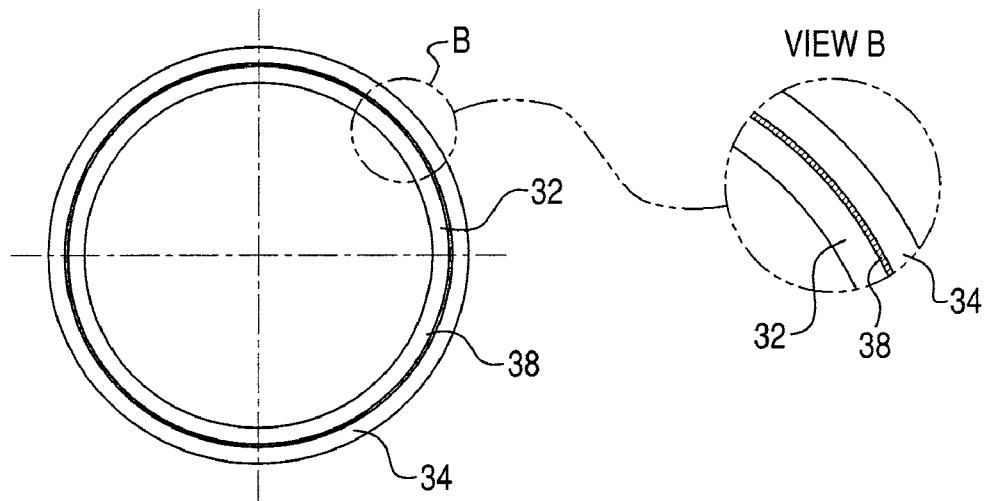
FIG. 10 is a partial section view illustrating the concentricity of the outer tube, inner tube and spacer.

Referring to FIG. 4, an exemplary embodiment of tube recliner mechanism 30 is illustrated and includes an inner tube 32, an outer tube 34, a retaining washer 36, at least one spacer 38 (as shown in FIGS. 7 and 10) and an internal locking mechanism 31. Outer tube 34 is connected to back-frame 20, and is pivotally connected to inner tube 32 through internal locking mechanism 31. Mounting bracket 22 is joined to inner tube 32, by cold forming the material of the outer end of inner tube 32 so that it forms a mechanical lock over retaining washer 36, which retains mounting bracket 22 in a fixed lateral and rotational position to inner tube 32. Other types of joining processes may be utilized to join mounting bracket 22, such as a welding (e.g., gas metal arc-welding or laser welding), to retaining washer 36 or inner tube 32.

Figure 5:
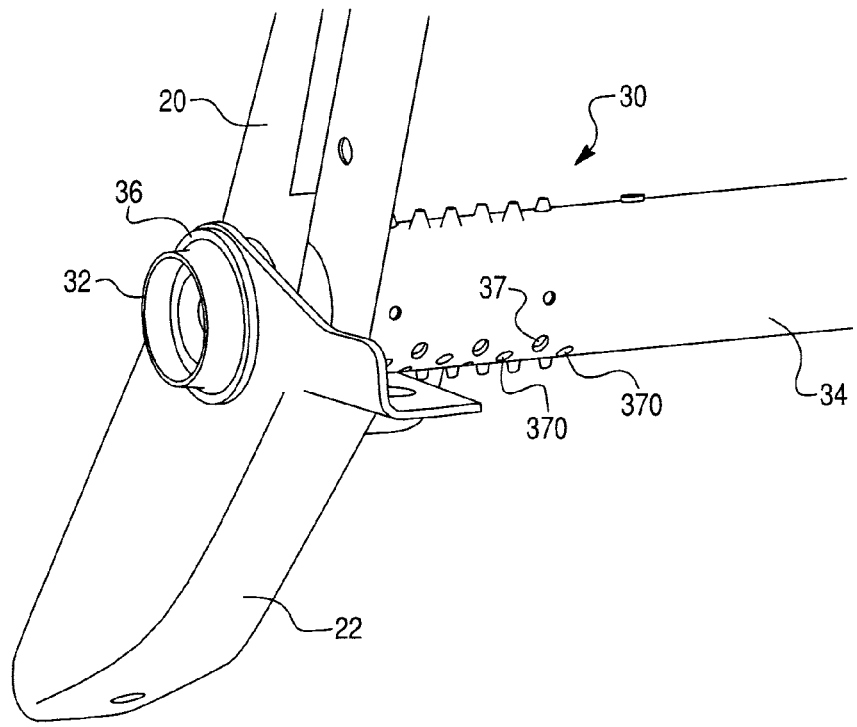
FIG. 5 is a rear perspective view of an exemplary embodiment of a tube recliner mechanism.
Figure 6:
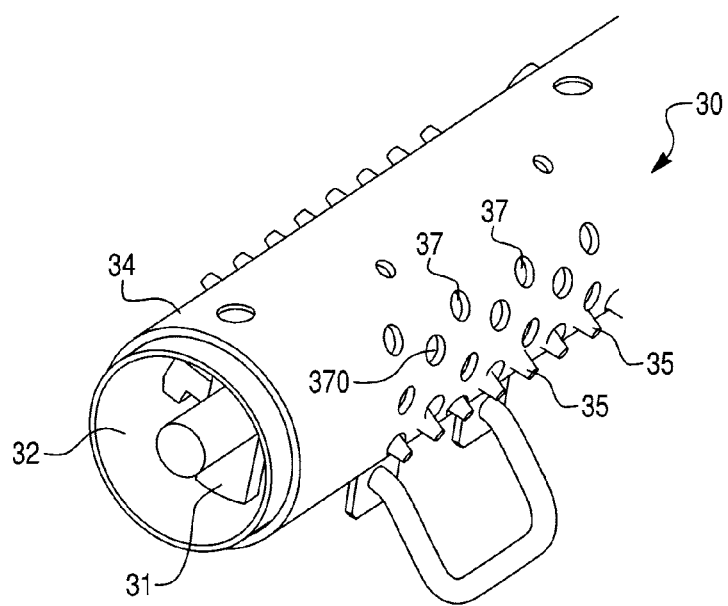
FIG. 6 is a perspective view of an exemplary tube recliner mechanism.

Referring to FIG. 5, an exemplary embodiment of tube recliner mechanism 30 is illustrated connected to back-frame 20 and mounting bracket 22, but shroud 24 is removed for clarity. Outer tube 34 includes a plurality of apertures 37 and includes a plurality of rotationally offset, second apertures 370, which are engaged by pins (or pawl) 35, which are illustrated in FIG. 6. When pins 35 are engaged in the apertures 37 or 370 of outer tube 34, tube recliner mechanism 30 prevents rotation between inner tube 32 and outer tube 34, therefore managing load (e.g., in the event of a dynamic impact by vehicle 10). When pins 35 are disengaged from the apertures 37 or 370 of outer tube 34, tube recliner mechanism 30 allows for rotation between inner tube 32 and outer tube 34, and the seat-back of the seat system 15 may rotate to provide adjustable comfort or convenience in the form of a fold flat seat-back.

Referring to FIG. 7, an exemplary embodiment of tube recliner mechanism 30 is illustrated by the partial section view. Inner tube 32 is illustrated after the swaging process which cold forms inner tube 32 to retain laterally retaining washer 36, which in turn retains mounting bracket 22.

Figure 8:
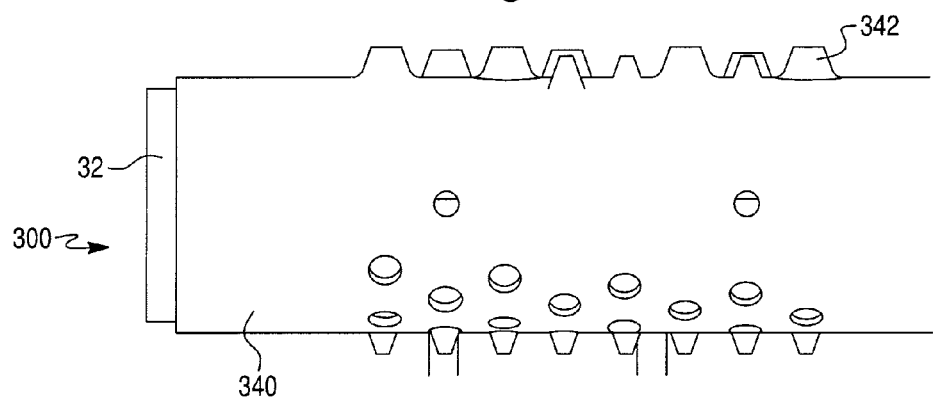
FIG. 8 is a rear view of an exemplary embodiment of a tube recliner mechanism.

Referring to FIG. 8, another exemplary embodiment of tube recliner mechanism 300 is illustrated and includes outer tube 340 and inner tube 32. Outer tube 340 may be formed with extruded holes 342 extending outward from the circumference of outer tube 340, which protect the pins of the internal locking mechanism 31 from being contacted by other objects.

Figure 9:
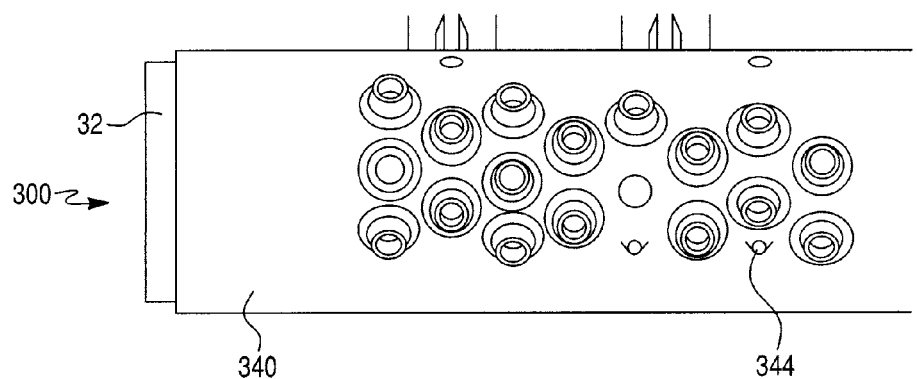
FIG. 9 is a top view of an exemplary embodiment of a tube recliner mechanism.

Referring to FIG. 9, another exemplary of tube recliner mechanism 300 is illustrated and includes outer tube 340 and inner tube 32. Outer tube 340 may be formed with protruded dimples 344 extending outward from the circumference of outer tube 340, which protect the pins of the internal locking mechanism 31 from being contacted by shroud 24, which slides over tube recliner mechanism 300.

Figure 11:
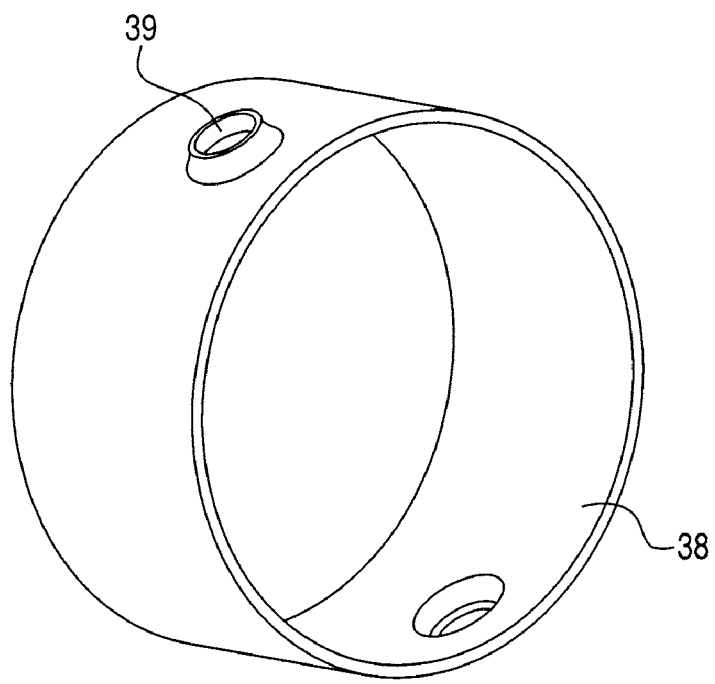
FIG. 11 is a perspective view of an exemplary embodiment of a spacer.

Referring to FIG. 10, an exemplary embodiment of tube recliner mechanism 30 illustrates the concentricity of outer tube 34, inner tube 32 and spacer 38. Spacer 38 may be made from a polymeric material (e.g., nylon or polyacetal), preferably through an injection molding process. Spacer 38 may be between the outer tube 34 and inner tube 32, and acts like a bearing, reducing friction and allowing for easier rotation of outer tube 34 relative to inner tube 32, as well as reduces noise during relative rotation, and reducing clearance in the system. An exemplary spacer 38 may be constructed of a cylindrical shape with thin wall thickness and may include at least one anti-rotation extrusion 39, as illustrated in FIG. 11.

Figure 12:
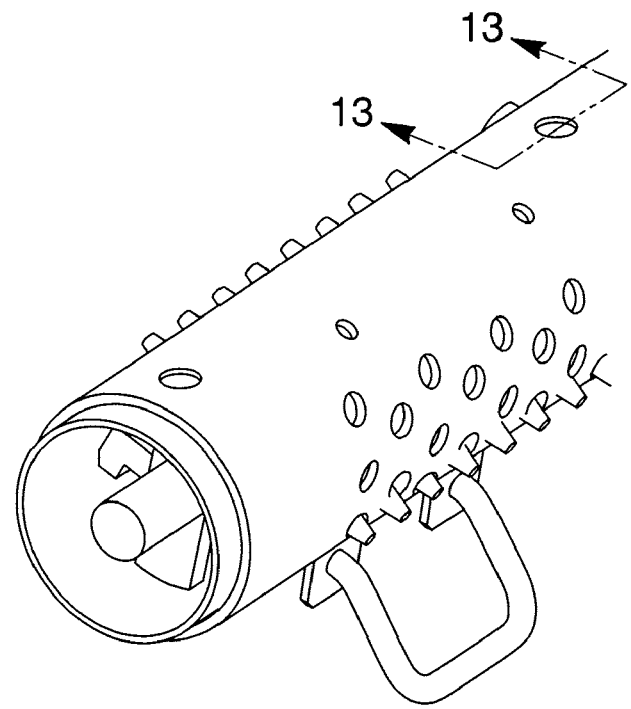
FIG. 12 is a perspective view of an exemplary embodiment of a tube recliner mechanism.
Figure 13:
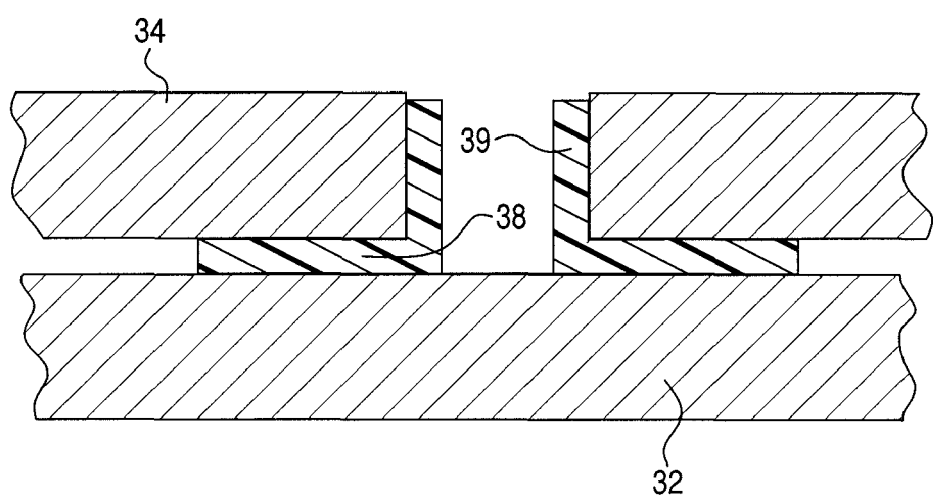
FIG. 13 is a partial section through the tube recliner mechanism.

Referring to FIG. 12, an exemplary embodiment of tube recliner mechanism 30 is illustrated showing the location of section 13-13, which is shown in FIG. 13. Spacer 38 provides a bearing surface to both inner tube 32 and outer tube 34 and spacer 38 includes anti-rotation extrusion 39, which may engage an aperture in outer tube 34 to prevent rotation between spacer 38 and outer tube 34.

Those reviewing the present disclosure will appreciate that various exemplary embodiments have been described herein. According to an exemplary embodiment, a tube recliner mechanism may include an outer tube constructed concentric to and around an inner tube, whereby the inner and outer tube have relative rotation through an internal locking mechanism. The outer tube may be connected to the back-frame of the seat system and may be pivotally connected through an internal locking mechanism to the inner tube, which may be connected to a mounting bracket through the process of swaging. The swaging process eliminates the need to weld the inner tube, therefore eliminating the possibility of deformation or warping of precision mechanism components by the addition of heat associated with welding. It is also undesirable to weld tubes because welding processes create expulsion of material (i.e., weld spatter) which may collect inside a tube and create noise and function issues. The swaging process also eliminates the need to use fasteners (e.g., bolts or rivets) to connect the components, therefore reducing mass and cost of the seat system.

Another exemplary embodiment of a tube recliner mechanism also includes at least one spacer which sits between the inner and outer tubes to provide concentricity and to reduce friction during relative rotation between the tubes. The spacer or outer tube may include an anti-rotation feature which prevents the relative rotation of the two. An exemplary tube recliner mechanism may further include a shroud which covers the tube recliner mechanism to prevent debris from entering the internal locking mechanism and to prevent other seat system components from contacting the pins of the internal locking mechanism. The outer tube may include protrusions in the form of extruded holes, lanced tabs, or dimples to maintain the proper distance between the shroud and the outer tube.

An exemplary embodiment of the outer tube is constructed using one section of steel having a uniform thickness. An alternative embodiment of the outer tube may be constructed out of three sections, whereby the two outer sections are constructed out of a higher strength (i.e., a higher mechanical properties) steel than the center section. The three sections are joined (e.g., using a laser welding process), either prior to or after forming into a tube, so that the three are concentric. This offers higher strength to the areas that are subjected to the higher torsional, bending and shear stresses during loading (e.g., during a dynamic vehicle impact) and therefore is more efficient at managing the load and energy exerted on the outer tube. Another alternative embodiment of the outer tube may be constructed out of three sections, whereby the two outer sections are constructed using a thicker material than the center section. The three sections are joined, preferably by a laser welding process, so that the three are concentric.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the FIGURES. It should be recognized that the orientation of particular components may vary greatly depending on the application in which they are used.

For the purpose of this disclosure, the terms "coupled," "joined," or other similar terms mean the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the recliner mechanism as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions as expressed in the appended claims.

What is claimed is:

1. A tube recliner mechanism for a vehicle seat having a reclining seat back comprising:
    an inner tube extending in a lateral cross vehicle direction and having inboard and outboard ends, the inner tube having an inner contiguous circumferential surface encircled by an outer contiguous circumferential surface;
    an outer tube positioned around the inner tube; and
    a cylindrical spacer positioned between the inner tube and the outer tube;
    wherein a relative rotational position of the inner and outer tubes is configured to change via rotation of one of the inner and outer tubes; and
    wherein the spacer, inner tube, and outer tube are all concentrically positioned to thereby reduce friction between the inner and outer tubes during relative movement between the inner and outer tubes.

2. The tube recliner mechanism of claim 1, wherein relative motion between the spacer and the outer tube is prevented.

3. The tube recliner mechanism of claim 2, wherein the relative motion between the spacer and the outer tube is prevented by an anti-rotation key located on either the spacer or the outer tube.

4. The tube recliner mechanism of claim 1, further comprising a shroud positioned to cover the tube recliner mechanism to thereby prevent interference between the tube recliner mechanism and adjacent components of the seat.

5. The tube recliner mechanism of claim 4, wherein one of the shroud and the outer tube includes a projection facing the other of the outer tube and the shroud for maintaining a distance between the shroud and the outer tube.

6. The tube recliner mechanism of claim 1, wherein the outboard end of the inner tube is connected with an interference fit to one of a mounting bracket and the seat back.

7. The tube recliner mechanism of claim 6, wherein the interference fit is created by cold forming the inner tube.

8. The tube recliner mechanism of claim 1, wherein one of the inner tube and the outer tube includes a first section and a second section, wherein the first and second sections are fixed together and have different strength characteristics.

9. The tube recliner mechanism of claim 8, wherein the first section and the second section comprise different materials.

10. The tube recliner mechanism of claim 9, wherein a thickness of the first section is greater than a thickness of the second section.

11. The tube recliner mechanism of claim 1, wherein the outer tube includes a first section and a second section, wherein the outer tube includes a hole and the inner tube includes a pin, wherein the tube recliner mechanism is configured so that in a locked position the pin engages the hole to prevent the relative movement between the inner and outer tubes and lock the seat back in position, wherein the second section includes the hole, and wherein a strength of the second section is greater than a strength of the first section.

12. A seat system for an occupant of a vehicle, the system comprising:
    a seat back;
    a seat bottom; and
    a tube recliner mechanism for providing adjustable rotation of the seat back for comfort of the occupant, the tube recliner mechanism including an inner tube extending laterally in a cross vehicle direction and an outer tube positioned around the inner tube;
    wherein relative rotational position of the inner and outer tubes is configured to change and be locked using an internal locking mechanism;
    wherein the tube recliner mechanism is located adjacent a seat cushion and includes a shroud positioned to cover the tube recliner mechanism, and
    wherein the shroud is configured to prevent interference between the tube recliner mechanism and adjacent components of the seat,
    wherein one of the shroud and the outer tube includes projections facing the other of the outer tube and the shroud for maintaining a radial distance between an inner circumferential surface of the shroud and an outer circumferential surface of the outer tube, and
    wherein the projections are fixed in stationary positions relative to a main body of the one of the shroud and the outer tube.

13. The seat system of claim 12, wherein the outer tube is configured to include the projections facing the shroud for maintaining the radial distance between the inner circumferential surface of the shroud and the outer circumferential surface of the outer tube.

14. The seat system of claim 12, further comprising a mounting bracket for the tube recliner mechanism, and wherein an outboard end of the inner tube is connected by an interference fit to one of the mounting bracket and a side member.

15. The seat system of claim 12, wherein one of the inner tube and the outer tube includes a first section and a second section, wherein the first section and the second section are fixed together and have different strength characteristics.

16. The seat system of claim 12, wherein the outer tube includes a first section and a second section, wherein the outer tube includes a hole and the inner tube includes a pin, wherein the tube recliner mechanism is configured so that in a locked position the pin engages the hole to prevent relative motion between the inner and outer tubes and lock the seat back in position, wherein the second section includes the hole, and wherein a strength of the second section is greater than a strength of the first section.

* * * * *